United States Patent [19]

Terui et al.

[11] 3,755,082

[45] Aug. 28, 1973

[54] METHANOL-ASSIMILATING PROPAGATION OF MICROBIAL CELLS

[75] Inventors: Gyozo Terui; Nobuo Takada; Hidekazu Sawada, all of Osaka, Japan

[73] Assignee: Gyozo Terui, Osaka, Japan

[22] Filed: Nov. 10, 1971

[21] Appl. No.: 197,437

[30] Foreign Application Priority Data
Dec. 11, 1970 Japan.............................. 45/110957

[52] U.S. Cl...................... 195/49, 195/115, 195/96, 195/140
[51] Int. Cl............................................. C12b 1/00
[58] Field of Search...................... 195/96, 28 R, 1, 195/49, 115, 94

[56] References Cited
UNITED STATES PATENTS

| | | | |
|---|---|---|---|
| 3,663,370 | 5/1972 | Kono et al. | 195/49 |
| 3,418,208 | 12/1968 | Coty | 195/115 |
| 3,219,319 | 11/1965 | Ash | 195/115 |
| 3,672,953 | 6/1972 | Coty et al. | 195/115 |

Primary Examiner—Alvin E. Tanenholtz
Assistant Examiner—Thomas G. Wiseman
Attorney—Joseph M. Fitzpatrick, Nels T. Lippert et al.

[57] ABSTRACT

A strain belonging to the new species *Pseudomonas methanolica* is aerobically cultured in a nutrient medium containing methanol as a substrate and the propagated microbial cells are recovered from the culture liquor.

5 Claims, 4 Drawing Figures

METHANOL-ASSIMILATING PROPAGATION OF MICROBIAL CELLS

BACKGROUND OF THE INVENTION

The present invention relates to a process for the propagation of microbial cells and is more specifically directed to a process for propagation of methanol-assimilating microbial cells by aerobically culturing *Pseudomonas methanolica* in a medium containing methanol.

Propagation of microbial cells to recover fermentation products or to recover cell protein is well known. Moreover, propagation of microbial cells in a medium containing hydrocarbons as the assimilable carbon source is also known. The benefits obtained by using hydrocarbons as a carbon source are also known particularly with respect to the savings incurred in industrial processes. However, many hydrocarbons have not been suitable for cultivation of microorganisms since the hydrocarbons could not be economically assimilated by any known microorganism.

Heretofore, attempts have been made at culturing microbial cells using methanol as the assimilable carbon source, but there has not, until now, been a satisfactory method wherein there is an industrially feasible rate of propagation and yield of microbial cells. To this end, the present inventors have isolated microorganisms which assimilate methanol and may be propagated in a medium containing methanol as the carbon source in an industially feasible manner.

SUMMARY OF THE INVENTION

The present invention provides a process for propagating methanol-assimilating microbial cells belonging to a new species of microorganism. The new species is named *Pseudomonas methanolica* and may be aerobically cultured in a medium containing methanol resulting in rapid propagation of the cells.

The newly isolated microorganism is characterized by the following properties:

a. Growth state on each of the following media
1. Bouillon: no growth
2. Bouillon agar: no growth
3. Glucose bouillon agar: no growth
4. Gelatin: no growth
5. Peptone water: no growth
6. Litmus milk: no growth
7. Potato: no growth
8. Methanol-containing synthetic medium (The composition shown below): very excellent growth Composition of the medium

| | |
|---|---|
| Potassium dihydrogenphosphate | 0.5g |
| Ammonium monohydrogenphosphate | 2.0g |
| Potassium chloride | 0.1g |
| Magnesium sulfate | 0.2g |
| Ferrous sulfate | 0.01g |
| Methanol | 10ml |
| Distilled water | 1,000ml |
| pH | 7.0 |

Size: $0.8 \times (1.5 - 2.0)$ μ
Shape: rod
Spore: none
Motility:
  Motile by means of single polar flagellum, of which electron-microscopic photo (magnification: 10,000 ×) is shown in FIG. 4 of the accompanying drawings.
Colonies: circular; raised; entire; pale pink
Pigment: pale pink; soluble in water; insoluble in organic solvents; non-diffusible b. Physiological properties
1. Optimum growth conditions: pH 7.0; temperature 30°C; aerobic.
2. Conditions for growth: pH 6.8 - 8.0; temperature 20 - 40°C; aerobic
3. Gram-negative
4. Non acid-fast
5. Methyl red test: negative
6. Voges-Proskauer reaction: negative
7. Indole: not produced
8. Hydrogen sulfide: not produced
9. Ammonia: not produced
10. Reduction of nitrates: positive
11. Catalase: positive
12. Gelatin and casein: not liquefied
13. Starch: not hydrolized
14. Citric acid: not utilized
15. Milk: not coagulated
16. Litmus: not reduced; methylene blue and 2,6-dichlorophenol indophenol: reduced
17. Ammonium salts: utilized; urea: utilized c. Utilization of the following carbon sources:

| | |
|---|---|
| 1. Arabinose: | not utilized | c. Utilization of the following carbon sources:

| | |
|---|---|
| 1. Arabinose: | not utilized |
| 2. Xylose: | " |
| 3. Glucose: | " |
| 4. Mannose: | " |
| 5. Fructose: | " |
| 6. Galactose: | " |
| 7. Lactose: | " |
| 8. Maltose: | " |
| 9. Sacchorose: | " |
| 10. Trehalose: | " |
| 11. Raffinose: | not utilized |
| 12. Sorbitol: | " |
| 13. Inositol: | " |
| 14. Glycerol: | " |
| 15. Salicin: | " |
| 16. α-methylglucoside: | " |
| 17. Inulin: | " |
| 18. Dextrin: | " |
| 19. Starch: | " |
| 20. Cellulose: | " |
| 21. Methanol: | utilized |
| 22. Methane: | not utilized |

The microbial characteristics of this new microorganism in comparison with the well-known, methanol-assimilable strains are given in the following Table 1.

TABLE 1

| Strains | *Pseudomonas methanica* | *Pseudomonas* AM-1 | *Methanomonas methanooxidans* | | Newly isolated strain "ATCC 21704" |
|---|---|---|---|---|---|
| Size | 0.4 x 1.5 | 0.3 x 0.7 | 0.8 x 2.0 | 1.0 x (1.5–4.0) | 0.8 x (1.5–2.0) |
| Gram stain | Negative | Negative | Negative | Negative | Negative. |
| Flagella | Polar | Polar | Polar | Polar | Polar. |
| Requirement for growth factor | (¹) | None | None | Not disclosed | None. |
| Pigment: | | | | | |
| Solubility | (²) | (²) | (³) | do | (²). |
| Color | (⁴) | Red | Red | do | Pale pink (yellow). |

TABLE 1—Continued

| Strains | Pseeudomonas methanica | Pseudomonas AM-1 | Methanomonas methanooxidans | Newly isolated strain "ATCC 21704" |
|---|---|---|---|---|
| Absorption wave length | 503 mμ | 507 mμ | (5) | Not disclosed | 520,550 mμ. |
| Presence of poly-β-hydroxybutyrate | + | + | + | − | −. |
| Utilization of carbon sources: | | | | | |
| Methane | + | − | − | + | −. |
| Methanol | + | + | + | + | +. |
| Ethanol | − | + | Not disclosed | Not disclosed | −. |
| Glycerine | − | Not disclosed | + | Not disclosed | −. |
| Glucose | − | do | + | do | −. |
| Fructose | − | do | + | do | −. |
| Formic acid | − | do | + | do | −. |
| Succinic acid | − | do | + | do | −. |
| Malic acid | − | do | + | do | −. |
| Fumaric acid | − | do | + | do | −. |
| Citric acid | − | do | + | do | −. |

1 Agar extract solution or pantothenic acid.
2 Water-insoluble, organic solvent-soluble.
3 Not disclosed organic solvent-soluble.
4 Red, brown, yellow or colorless.
5 526,497, 472,388, 315,270 mμ.

As is noted in Table 1, the newly isolated microorganism is characteristic of assimilating only methanol as a conventional carbon source, which is different from other similar methanol-assimilating microorganisms. Moreover, as to the solubility of the produced pigment, which is generally an important factor in identification of this type of bacteria, the pigment of the newly isolated strain is soluble in water but not in organic solvents. Further, the pigment has maximum absorbances at 520 mμ and 550 mμ which are different from those of the pigments produced by the known similar strains. Thus, regarding these taxonomical differences as important, the present inventors identified the said isolated microorganism as belonging to a new species different from the known similar species and named the new species *Pseudomonas methanolica*. This microorganism has been deposited with the American Type Culture Collection, Rockville, Md., and has been given accession number 21704.

Specific embodiments of the invention have been chosen for purposes of illustration and description in the accompanying drawings, forming a part of the specification wherein.

Figure 1:
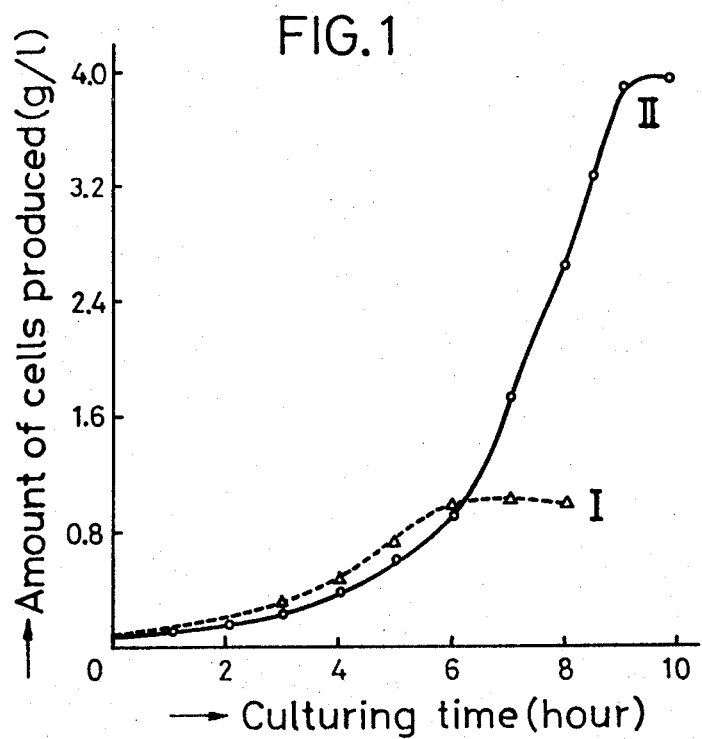
FIG. 1 is a graph illustrating the relation between culturing time and yield of microbial cells in a single vessel culturing of *Pseudomonas methanolica* ATCC 21704 in a medium containing methanol.

With reference to FIG. 1, *Pseudomonas methanolica* ATCC 21704 is aerobically cultured at 30°C in a medium having the following composition

| | |
|---|---|
| Patassium dihydrogenphosphate | 0.5g |
| Ammonium monohydrogenphosphate | 2.0g |
| Potassium chloride | 0.1g |
| Magnesium sulfate | 0.2g |
| Ferrous sulfate | 0.01g |
| Methanol | 10ml |
| Distilled water | 1,000ml |
| pH | 7.0 |

Curve II depicts *Pseudomonas methanolica* ATCC 21704 which is cultured in a flask under the conditions of an inoculum ratio of 2%(V/V) and an initial methanol concentration of 1% (V/V), the strain continues a logarithmic propagation after an inducing period of about one hour and completely consumes the methanol in a short period of about 9 hours. The specific propagation rate ($\mu$ max.) of the logarithmic propagation period of this strain is 0.49 ($hr^{-1}$), and accordingly, the average time for doubling is about 1.4 hours which is very short as compared with that of known strains. This is a characteristic feature of the strain. Moreover, the yield of dry cells to the added methanol showed a very high value of about 50 percent. It has also been found that when the strain is cultured at a 0.2% (V/V) methanol concentration as shown by Curve I, the induction period is shortened. It has also been found that even at a 0.01% (V/V) methanol concentration, the value of $\mu$max. is not lowered.

Figure 2:
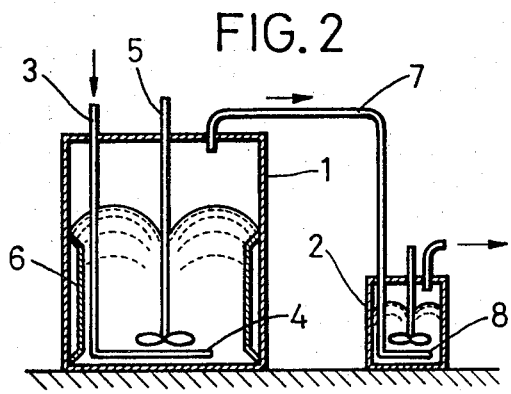
FIG. 2 is a schematic view of a double tank culturing apparatus.

The present inventors have also found that in carrying out the present invention any of the following means is suitable to prevent volatile loss of methanol during the aeration-agitation culturing in a culturing tank:

a. carrying out culturing in a single tank while keeping the concentration of methanol stationarily below 0.2% (V/V) by successively supplying methanol, and b. carrying out culturing using a compound apparatus consisting of main and secondary culturing tanks as shown in FIG. 2. In this embodiment, a medium containing comparatively high concentration of methanol such as 1 − 2% (V/V) is placed in the main culturing tank (1) and a gas discharged therefrom containing volatilized methanol is led through a linking pipe (7) to a secondary culturing tank (2) (About one-fifth capacity of the main tank is sufficient) in which a medium containing a far lower concentration of methanol is placed and wherein the strain has previously been inoculated. The culturing according to the procedure (b) enables complete recovery of methanol as described below, and the total yield of cells from both tanks amounts to 54 percent to methanol. This is a considerable increase in yield compared with the procedure using a single tank. Furthermore, an attempt of accumulating microbial cells in high cencentration by feeding successively methanol to keep the methanol concentration at 1% (V/V) during the course of culturing according to procedure (b), has resulted in a remarkably high concentration of microbial cells within a short period of time as described below.

Continuous culturing is also appropriate for the present invention i.e., continuously applying culture medium to the culturing tank along with a partial discharge of the culture liquor, the microbial cells are obtained at a rate of 0.42g/l/hr when the methanol concentration of the feed medium is adjusted to 0.2% (V/V) and the dilution ratio to 0.49. Continuous culturing may also be conducted while adjusting the methanol concentration of the medium to be supplied to 4.0% (V/V), and, as a result, 7.5g/l/hr of the cells are produced continuously. In the latter case, the methanol concentration of the medium in the culturing tank at equilibrium remains less than 0.2% (V/V) and, therefore, a secondary culturing tank for the recovery of volatilized methanol is practically unnecessary.

The propagated microbial cells are recovered by a conventional method such as centrifugation.

Practice of certain specific embodiments of the invention is illustrated by the following representative examples.

EXAMPLE 1

In this example, a culturing apparatus comprising a main culturing tank (1) and a secondary culturing tank (2), as shown in FIG. 2, is utilized. Culturing is carried out under the conditions below described, with aeration from a circular sparger (4) equipped at the end of an aeration pipe (3) in the liquid bottom together with agititaion by an agitator (5) and baffles (6), while the culturing of the liquid in the secondary tank (2) is carried out under the conditions below described. A gas discharged from the main tank containing volatilized methanol is led to the secondary tank through a linking pipe (7) connecting both tanks. The pipe (7) terminates at the bottom part of the secondary tank as a circular sparger (8) whereby the volatilized methanol is introduced into the culture medium of the secondary tank.

A strain of *Pseudomonas methanolica* ATCC 21704 is inoculated into both tanks and the following culturing conditions are met:

|  | Main tank | Secondary tank |
|---|---|---|
| Capacity | 10 liters | 2 liters |
| Amount of medium | 5 liters | 1 liter |
| Revolutions | 800 rpm | 400 rpm |
| Amount of aeration | 1 vvm | 1 vvm |
| Culturing temperature | 30°C | 30°C |
| Culturing time | 10 hrs | 10 hrs |
| Initial methanol concentration | 1% (V/V) | 0.2% (V/V) |
| Concentration of the cells | 3.6g/l | 1.6g/l |

Composition of the medium except methanol:

| | |
|---|---|
| Potassium dihydrogen-phosphate | 0.5g |
| Ammonium monohydrogenphosphate | 2.0g |
| Magnesium sulfate | 0.2g |
| Potassium chloride | 0.1g |
| Ferrous sulfate | 0.01g |
| Distilled water | 1,000ml |
| pH | 7.0 |

As a result, the methanol recovery to the secondary culturing tank (2) is carried out completely, and total yield of the cells from these two tanks amounts to 54 percent to methanol. The cells are recovered by contrifugation.

EXAMPLE 2

Figure 3:
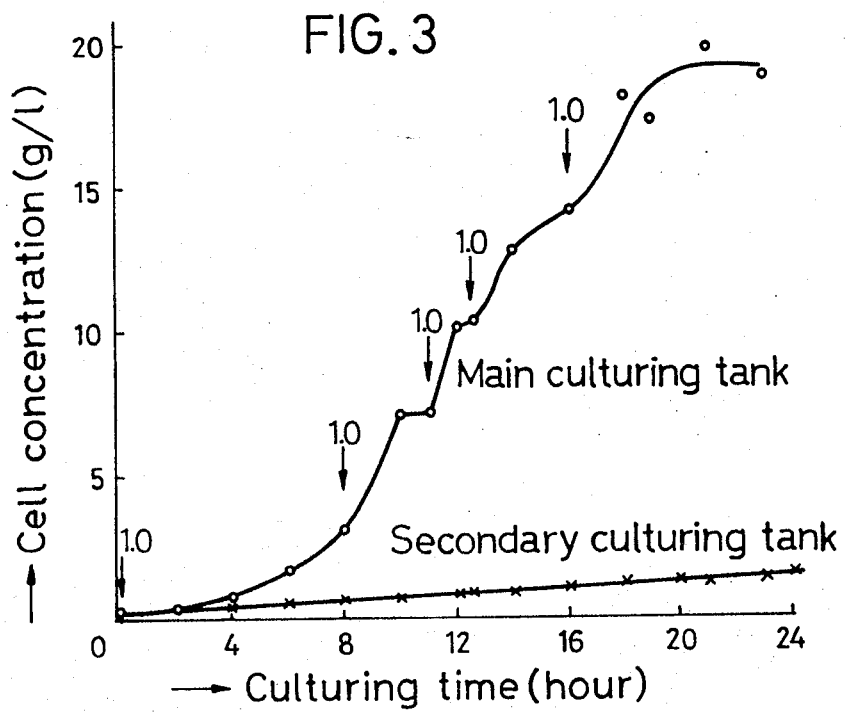
FIG. 3 is a graph illustrating the relationship between culturing time and concentration of microbial cells in an alternative culturing process.
Figure 4:
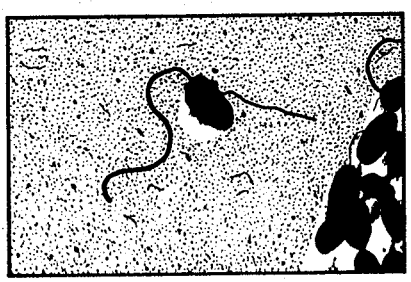
FIG. 4 is an electron microscope photograph (10,000 x) of *Pseudomonas methanolica* ATCC 21704.

In this example, a strain of *Pseudomonas methanolica* ATCC 21704 is inoculated into main and secondary tanks and culturing is carried out with aeration-agitation under the following conditions while successively supplying the tank with methanol at intervals of time marked by the arrows in FIG. 3. In such manner the methanol concentration of the culture medium is maintained at 1.0% (V/V). Culturing conditions:

| Composition of the medium | |
|---|---|
| Potassium dihydrogenphosphate | 0.5g |
| Ammonium monohydrogenphosphate | 2.0g |
| Potassium chloride | 0.1g |
| Magnesium sulfate (heptahydrate | 0.2g |
| Ferrous sulfate (heptahydrate) | 0.01g |
| Distilled water | 1,000ml |
| pH | 7.0 |
| Culturing temperature | 30°C |

The increase in the cell concentration with the lapse of culturing time is shown in FIG. 3. As is shown in the figure, about 20g/l of the cells are accumulated after culturing for 20 hours and the yield amounts to about 50 percent to methanol. The accumulated cells are recovered by centrifugation.

EXAMPLE 3

In this example, a strain of *Pseudomonas methanolica* ATCC 21704 is inoculated into a 1 liter fermenter and continuous culturing is carried out under the following conditions while supplying the fermenter with a medium and partially discharging the culture liquor therefrom, continuously. The produced cells are recovered from the discharged culture liquor by centrifugation. Culturing conditions:

| Composition of the medium | |
|---|---|
| Potassium dihydrogenphosphate | 0.5g |
| Ammonium monohydrogenphosphate | 2.0g |
| Potassium chloride | 0.1g |
| Magnesium sulfate | 0.2g |
| Ferrous sulfate | 0.01g |
| Methanol | 2ml |
| Distilled water | 1,000ml |
| pH | 7.0 |

Limiting substrate: methanol
Methanol concentration in the medium to be supplied: 0.2% (V/V)
Apparatus: 1 liter small fermenter
Amount of culture medium: 400 ml
Amount of aeration: 1 vvm
Stirring: 800 rpm
Culturing temperature: 30°C
Feeding rate of medium required for obtaining maximum yield of the cells per unit time (discharging rate of culture liquor): 196 ml/hr As a result, the following excellent results are obtained:

| | |
|---|---|
| Stationary concentration of cells: | 0.83 g/l |
| Maximum amount of cells produced; | 0.42 g/l/hr |
| Yield of cells: | 52% |

EXAMPLE 4

In this example, continuous culturing is carried out in the same manner as in Example 3 except with a methanol concentration of 4.0% (V/V) in the feed medium. The following results are obtained:

| | |
|---|---|
| Stationary concentration of cells: | 15.3 g/l |
| Maximum amount of cells produced: | 7.5 g/l/hr |
| Yield of cells: | 48% |

An analysis of the composition of the cells (dry product) obtained through the continuous culturing in Example 4 shows that the product cells contain, in 70 percent, the crude protein containing the following amino acids, which is a protein of good quality. Similar results are obtained from the product cells of Examples 1, 2 and 3.

Composition of amino acids in dry cells (%)

| | | | |
|---|---|---|---|
| lysine | 3.4 | alanine | 5.6 |
| histidine | 1.3 | valine | 4.4 |
| arginine | 3.8 | methionine | 1.3 |
| asparagine | 9.4 | isoleucine | 3.9 |
| threonine | 4.1 | leucine | 5.9 |
| serine | 3.6 | tyrosine | 2.4 |
| glutamic acid | 10.0 | phenylalanine | 3.4 |
| glycine | 4.2 | tryptophane | 0.6 |
| proline | 5.1 | cystine | 0.3 |

What is claimed is:

1. A process for the production of microbial cells which comprises aerobically culturing a strain of Pseudomonas methanolica in the culture medium containing methanol as the main source of assimilable carbon, accumulating the microbial cells in said medium and then separating and recovering said microbial cells.

2. The process of claim 1 wherein said strain of *Pseudomonas methanolica* is *Pseudomonas methanolica* ATCC 21704.

3. The process of claim 1 wherein said culturing is carried out in a single tank fermenter and said process further includes the step of maintaining the concentration of methanol in said culture medium stationarily below 0.2% (V/V).

4. the process of claim 1 wherein said culturing step includes the steps of culturing said strain in a main culturing tank containing a culture medium having a methanol concentration of from 1 to 2% (V/V), and venting volatilized methanol into a secondary culturing tank containing an inoculated culture medium having a methanol concentration less than said main tank to effect complete recovery of methanol.

5. The process of claim 1 wherein said culturing step includes the steps of continuously supplying culture medium to a culturing tank and partially discharging culture liquor from said tank while maintaining the methanol concentration in said culturing tank to less than 0.2% (V/V).

* * * * *